April 8, 1941. C. J. ELLIS ET AL 2,237,981
PROCESS FOR PRODUCING MAPLE FLAVORING EXTRACT
Filed Feb. 7, 1940
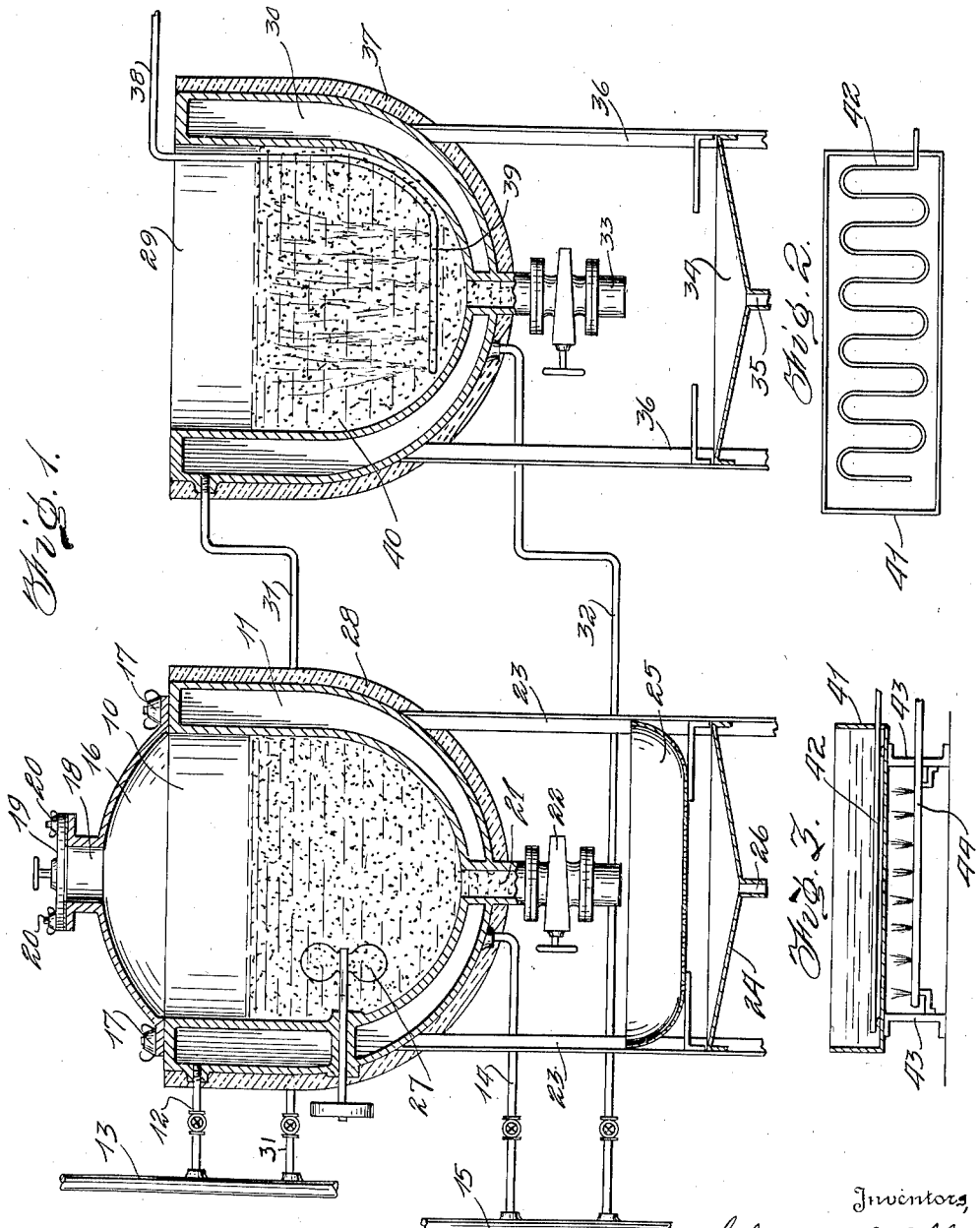
Inventors,
Clayton J. Ellis,
Ambrose H. Donaldson,
By Frank S. Appleman,
Attorney Patented Apr. 8, 1941

2,237,981

UNITED STATES PATENT OFFICE 2,237,981

PROCESS FOR PRODUCING MAPLE FLAVOR-ING EXTRACT

Clayton J. Ellis, Middlebury, and Ambrose H. Donaldson, Burlington, Vt.; said Ellis assignor to said Donaldson Application February 7, 1940, Serial No. 317,748

3 Claims. (Cl. 99—142)

This invention relates to a process for the extraction of maple flavoring from maple wood, and further relates to apparatus for carrying into practice the aforesaid process.

More particularly the invention relates to a continuation in part of the process disclosed in my prior application for patent for producing flavoring extract, filed March 31, 1939, and bearing Serial Number 265,338.

In the production of a flavoring extract from maple wood, it is necessary, in order to produce a proper proportion of extract from a given quantity of wood, to comminute the wood and this may be done in any desired manner so as to make particles of wood preferably about the size of the particles in ordinary sawdust and, for the purposes of the following description of the invention and in the claims the form in which the maple wood is used will be designated as "ground maple wood."

Maple wood, besides that ingredient which gives the characteristic flavor to maple sugar and maple syrup, contains a number of undesirable constituents which must be removed in order to prevent disagreeable and unwanted taste in the finished product. Some of these undesirable constituents have been found by us to be soluble in water. Others have been found readily oxidizable when acted on by the atmosphere. We have further found that action of heated water alone would not remove from maple wood the maple flavoring matter in sufficient quantity to make a commercially valuable product but that such a valuable maple flavoring extract may be obtained from maple wood by a hot water solvent if accompanied by pressure sufficient to rupture the cells of the wood so as to enable the aqueous solvent to have free access thereto. Further, it is to be noted that when such treatment is effected by boiling water, the pressure employed will cause elevation of the boiling point of the water and improved solution of the extract due to such increase.

One object of the invention is, therefore, to provide an improved process wherein one step of the process involves solution and removal of certain of the undesirable water soluble constituents of the wood before further steps are taken to extract the useful maple flavoring.

A second important object of the invention is to provide a step in the process whereby undesirable constituents extracted with the maple flavoring may be oxidized and thereby either be converted into such state that they will separate from and be carried away from the extracted maple flavoring or be rendered innocuous and tasteless.

A third important object of the invention is to effect the aqueous solution of maple flavoring from the wood at such a temperature as to readily dissolve the constituents giving this flavor, while leaving no commercially important residue and to effect such solution under such pressure that the flavor containing cells of the wood will burst and permit free access of the solvent to the flavoring constituents.

A fourth important object of the invention is to provide in the process the step of concentrating the extract solution with great rapidity so as to prevent losses of flavor found to exist if concentration is slowly performed.

A fifth important object of the invention is to provide a novel arrangement of apparatus for utilizing our process in the commercial production of maple flavoring from ground maple wood.

Other important objects of the present invention are to provide a true and pure maple flavor-producing constituent or constituents for the purpose of flavoring products with the pleasing maple flavor which is preferred by many at a reasonable cost which is within the means of everyone; to make use of the maple trees which have been damaged by acts beyond the acts of man and which may be salvaged for such purpose; to produce a distinct, pure maple flavor which, when properly added to such products as syrups extracted from cane and such other products which are hard to be flavored, may successfully and economically be flavored to a pleasing pure maple taste; to simplify and cheapen the production of a flavoring constituent, and to save on the demand of the natural supply of maple syrup and sugar from the sap of the sugar maple tree, which is limited in quantity, and the continued extraction of the sap eventually kills the tree and gradually decreasing the supply.

With the above and other objects in view, as will be presently apparent, the invention consists of a process for the extraction of maple flavoring from maple wood embodying certain novel steps and a novel sequence of these and other steps.

The invention further consists of an apparatus having certain novel features of construction and combinations of parts hereinafter fully described and illustrated in the accompanying drawing.

In the drawing, like characters of reference indicate like parts in the several views, and Figure 1 illustrates a vertical median section of the apparatus used in connection with this process;

Figure 2 illustrates a top plan view of an evaporator pan adapted to be used in connection with this process; and Figure 3 illustrates a side view partly in elevation and partly in section showing one means of utilizing such an evaporator pan.

In carrying out the process of this invention, maple wood is ground, sawed, or otherwise treated to reduce the wood to small particles about the size of ordinary sawdust particles.

A desired quantity of ground maple wood is placed in a suitable receptacle, together with a quantity of water, preferable proportions being 1 pound of the ground maple to 40 pounds of water. The ground maple is steeped in the water for a desired length of time, which is preferably at least 12 hours. The water, during this period, may be either cold or be heated to a temperature below boiling. During this step in the process, certain undesirable constituents are dissolved but the constituents which afford the desired maple flavoring are practically insoluble in water below boiling temperature at atmospheric pressure and remain in the ground wood. After the expiration of the steeping period the ground wood is separated from the liquid and the latter is discarded. This leaves the ground wood free from the water soluble undesirable constituents.

The separate wood is now placed in a suitable closed vessel with fresh water in the same proportions as before. That is to say, with 40 pounds of water to each pound of the original ground maple. The mixture of ground wood and water is now brought to the boiling point under sufficiently high pressure to rupture the wood cells. Preferably the pressure used is 75 pounds per square inch. Obviously, to effect boiling under such pressure the temperature must be well above the normal boiling temperature of 212° F. The boiling under these conditions is maintained for a period of 5 hours. The liquid is agitated during this time by the boiling and the agitation may be augmented by mechanical stirring. This stage in the treatment dissolves the remaining water soluble constituents which include not only the flavoring material but also certain other extracts which are undesirable and which, if allowed to remain in the finished product, would give the product disagreeable and impure flavors.

The next step in the process is to strain off the liquid from the now spent wood and after the straining to filter the strained liquid to remove all traces of the cellulosic ground maple and leave a clear liquid.

The clear liquid is now subjected, under atmospheric pressure, to rapid boiling until reduced to the required concentration and we have found that a suitable concentration is effected if 250 units are subjected to concentration until the liquid amounts to 2 units. During this concentration the liquid is constantly aerated either by spraying hot air into the lower part of the liquid mass or by constantly stirring to expose continuously fresh surfaces of the liquid to the atmosphere, the latter method being preferably performed in shallow pans so that large surface areas of liquid may be constantly in contact with the air. In this step, the undesirable constituents are oxidized by the aeration and will either pass off as vapor or gas or will so change chemically as to render them inert and tasteless so that the finished product is a pure maple flavoring extract free from all other taste than that proper to maple syrup or the like. It is to be noted that with the desirable flavoring there is also extracted certain desirable coloring matter which gives the finished product the rich golden brown color of high grade maple syrup.

This flavoring extract may be added to cane syrup, beet syrup and other edible syrups to give them the desirable maple flavor and may also be used for imparting such flavor to a wide variety of edibles such as candies, icings, cakes, sauces, jellies and many others.

A suitable and novel apparatus for carrying out the foregoing process is shown in the accompanying drawing and in Figure 1 there is illustrated a kier or digester 10 having a steam jacket 11 which is provided with steam through a valved pipe 12 from a steam main 13. Steam and any condensate that may form are conducted from the steam jacket 11 through a valved pipe 14 leading to a return main 15. The mains 13 and 15 are connected to any suitable steam-producing device (not shown). The kier or digester is provided with a tight lid or cover 16 which is here shown as secured in position by bolts and nuts 17. Obviously, the lid may be welded or otherwise permanently attached to the body of the kier. The lid 16 is provided with a large charging opening 18 which may serve also as a manhole for use in cleaning the interior of the kier. A manhole cover 19 normally closes the opening, being secured in position by bolts and nuts, as shown at 20. An outlet 21 is provided at the bottom of the kier and this outlet is controlled by a valve 22. The kier is supported in elevated position by legs 23 and beneath the outlet is a flat funnel-like liquid collecting pan 24 between which and the outlet a removable strainer 25 is suitably supported. The pan 24 has a draw off pipe or outlet 26. A stirrer or agitator may be used in connection with this kier and is indicated in general at 27. A heating insulating jacket 28 covers the outer wall of the steam jacket 11.

A similar vessel 29 having an open top is also disclosed and this vessel has a steam jacket 30 connected by the valved pipes 31 and 32 with the steam and return mains, respectively. A valved outlet 33 and liquid collecting pan 34 like those previously described are used with the vessel, but the pipe 35 of the pan 34 leads to a suitable waste receiving device such as a sewer. The vessel 29 is supported on legs 36 and is provided with a heat insulating jacket 37. Extending downwardly into the vessel 29 is an air supply pipe 38 receiving hot air under pressure from any suitable source of supply and a spray head 39 is carried on the lower end of the pipe 38 and fine jets of air escape through suitable openings in this head to pass up through the mixture of liquid 40 held in the vessel 29.

In Figures 2 and 3 an evaporator 41 of shallow pan shape is shown as provided with a spray or jet pipe 42 extending sinuously over its bottom and this pan may be supported on legs 43 over a gas burner head 44.

With this apparatus the first steeping is performed in the vessel 29 and the mixed liquid and ground maple is drawn off through the outlet 33 to pass into the strainer 25 which at the time is placed below this outlet. The liquid flows through the strainer to the pan 34 and is carried off to the sewer. The ground maple which remains in the strainer is dumped through the charging opening 18 into the kier where it is boiled with the water under pressure as described. From the kier it is drawn off through the outlet 21 and strained as before, but in this case the woody matter is discarded and the liquid is collected from the pipe 26, filtered and returned to the vessel 29 for concentration, or alternately, to evaporating pans of the type shown in Figs. 2 and 3.

We claim:

1. In a process of producing maple flavoring from ground maple wood, steeping the ground wood in water, removing the water and adding fresh water to the steeped ground wood, boiling the mixture of fresh water and wood under pressure in excess of atmospheric pressure, separating the liquid from the boiled mixture, and concentrating the separated liquid while simultaneously aerating the same.

2. In a process of producing maple flavoring from ground maple wood, steeping the ground wood for twelve hours in water, removing the water and adding fresh water to the steeped wood, boiling the mixture of fresh water and wood for five hours under a pressure of seventy-five pounds per square inch, straining the boiled mixture to remove the wood, filtering the remaining liquid, and rapidly boiling the filtered liquid while causing streams of air to pass upwardly therethrough.

3. In a process of producing maple flavoring from ground maple wood, steeping the ground wood for twelve hours in water, removing the water and adding fresh water to the steeped wood, boiling the mixture of fresh water and wood for five hours under a pressure of seventy-five pounds per square inch, straining the boiled mixture to remove the wood, filtering the remaining liquid, and rapidly boiling the filtered liquid while causing streams of air to pass upwardly therethrough until 250 parts of liquid has been reduced to 2 parts.

CLAYTON J. ELLIS.
AMBROSE H. DONALDSON.